United States Patent
Bai et al.

(10) Patent No.: US 11,021,649 B2
(45) Date of Patent: Jun. 1, 2021

(54) FLOWBACK RESISTANT PROPPANTS

(71) Applicant: Fairmount Santrol Inc., Chesterland, OH (US)

(72) Inventors: Litao Bai, Houston, TX (US); Kanth Josyula, Sugarland, TX (US); Vinay Mehta, Richmond, TX (US)

(73) Assignee: Fairmount Santrol Inc., Independence, OH (US)

( * ) Notice: Subject to any disclaimer, the term of this patent is extended or adjusted under 35 U.S.C. 154(b) by 0 days.

(21) Appl. No.: 15/919,399

(22) Filed: Mar. 13, 2018

(65) Prior Publication Data

US 2018/0265772 A1     Sep. 20, 2018

Related U.S. Application Data

(60) Provisional application No. 62/473,677, filed on Mar. 20, 2017.

(51) Int. Cl.
| | | |
|---|---|---|
| *E21B 43/267* | (2006.01) | |
| *C09K 8/80* | (2006.01) | |
| *C09K 8/68* | (2006.01) | |
| *C09K 8/62* | (2006.01) | |
| *C09K 8/88* | (2006.01) | |

(52) U.S. Cl.
CPC ............... *C09K 8/805* (2013.01); *C09K 8/62* (2013.01); *C09K 8/68* (2013.01); *C09K 8/88* (2013.01); *E21B 43/267* (2013.01)

(58) Field of Classification Search
CPC .. C09K 8/805; C09K 8/62; C09K 8/68; E21B 43/267
See application file for complete search history.

(56) References Cited

U.S. PATENT DOCUMENTS

| | | | | |
|---|---|---|---|---|
| 3,850,651 | A | * 11/1974 | Duncan | ............... C04B 24/2641 524/5 |
| 5,508,325 | A | 4/1996 | Craun | |
| 2006/0201673 | A1 | 9/2006 | Welton | |
| 2008/0020207 | A1 | 1/2008 | Hashiba | |
| 2008/0230223 | A1* | 9/2008 | McCrary | ................. C09D 5/03 166/272.2 |
| 2013/0065800 | A1* | 3/2013 | McDaniel | .............. C09K 8/805 507/219 |
| 2013/0233545 | A1* | 9/2013 | Mahoney | ................. C09K 8/80 166/280.2 |
| 2014/0000891 | A1* | 1/2014 | Mahoney | ............... C09K 8/805 166/280.2 |
| 2014/0060832 | A1* | 3/2014 | Mahoney | ................. C09K 8/80 166/280.2 |

OTHER PUBLICATIONS

Search Report and Written Opinion for International Application No. PCT/US2018/022127 dated Jun. 20, 2018.
First Examination Report for GGC Patent Application No. GC 2018-34959 dated Oct. 16, 2019.

* cited by examiner

*Primary Examiner* — Silvana C Runyan

(74) *Attorney, Agent, or Firm* — Calfee, Halter & Griswold LLP

(57) ABSTRACT

A resin coated proppant capable of self-bonding at temperatures as low as 70° F. (~21° C.) is made from an aqueous dispersion of a self-bonding vinyl aromatic/acrylic ester addition copolymer.

18 Claims, 1 Drawing Sheet

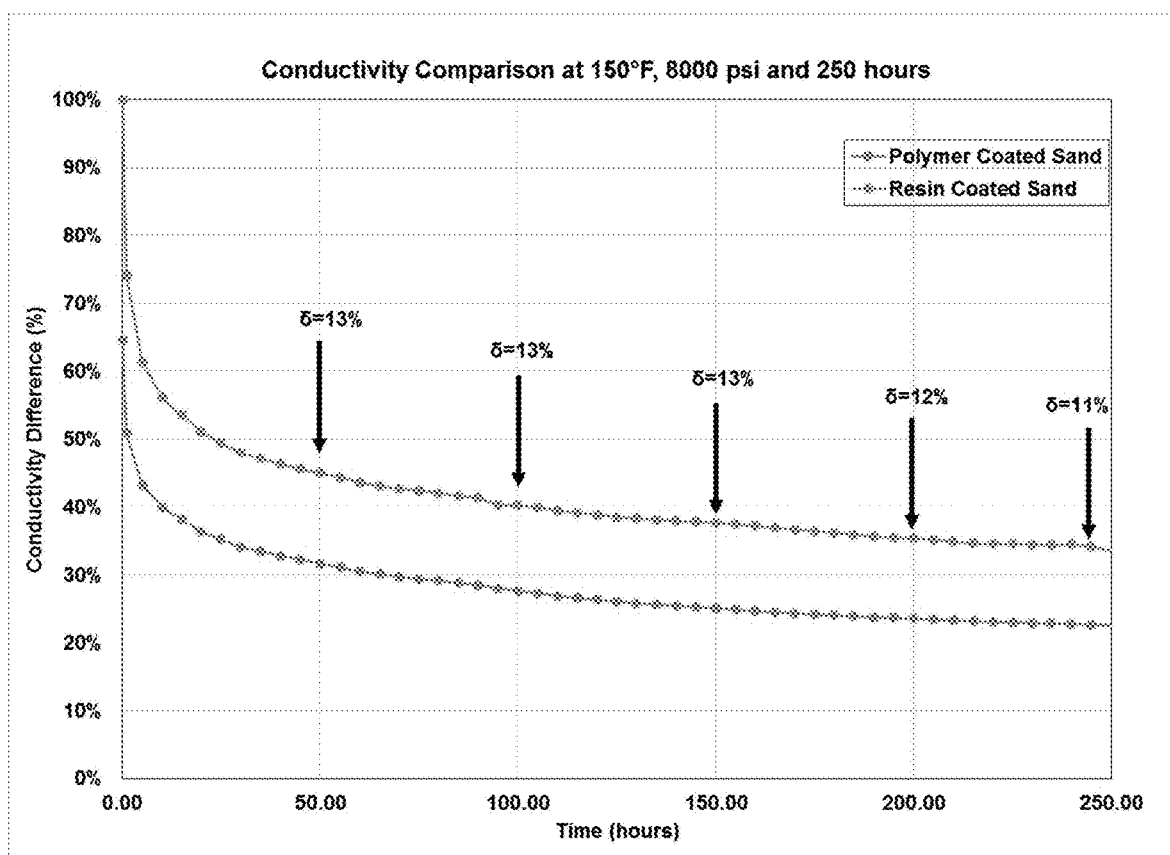

FLOWBACK RESISTANT PROPPANTS

CROSS REFERENCE TO RELATED APPLICATION

This application claims the benefit of U.S. Provisional Patent Application No. 62/473,677, filed Mar. 20, 2017, entitled 'FLOWBACK RESISTANT PROPPANTS'. The entire disclosure of which is incorporated herein by reference.

BACKGROUND

Two types of resin coated proppants are used in the hydraulic fracturing of oil and gas-bearing subterranean formations—those in which the resin is uncured or only partially cured, which are known as "curable resin coated proppants," and those in which the resin is essentially fully cured, which are known as "tempered" or "pre-cured" resin coated proppants. In both cases, the purpose and effect of the resin coating is to increase the strength of the "proppant pack" (amalgamated proppant mass) formed by the proppant downhole in the sense of resisting degradation due to the elevated temperatures and pressures encountered there.

Curable resin coated proppants differ from tempered resin coated proppants in that their curable resin coatings cure in response to the elevated temperatures encountered downhole. This causes the resin coatings of the individual proppant particles to bond one another, thereby forming a polymer network which tends to capture and hold the individual proppant particles forming the proppant pack in place.

Because of this additional capturing feature, curable resin coated proppants are normally used when the subterranean formation to be fractured is prone to proppant flowback. Proppant flowback is the problem that occurs when individual proppant particles released from a degrading proppant pack flow back into the well. Curable resin coated proppants tend to alleviate this problem, because the polymer network formed by the curable resin coatings of this type of proppant tends to capture and hold the individual proppant particles in place, even after proppant pack degradation, thereby preventing them from flowing back into the well.

When the subterranean formation to be fractured is not prone to proppant flowback, tempered resin coated proppants are normally used, because the enhanced ability of curable resin coated proppants to capture and hold individual proppant particles released from a degrading proppant pack is not needed in these applications.

In commercial practice, both types of resin coated proppants, i.e., both curable and tempered, are normally made with a novolac, phenolic urethane or epoxy urethane polymer resin. When the curable polymer resin is a novolac, these products are normally made by melt coating the proppant substrate particle, which is normally sand, with a preformed novolac. When the curable polymer resin is a phenolic or epoxy urethane, these products are normally made by an in situ polymerization coating technique in which a low molecular weight phenolic or epoxy resin and an isocyanate-functional hardener are combined with the sand in such a way that the phenolic or epoxy urethane resin is formed at the same time it coats the sand.

In both cases, the polymer resin system is heated to relatively high temperature, e.g., 300° F. (~149° C.) or more, which is usually done by heating the sand before it is combined with the polymer system. In addition, because of the high viscosities involved, high intensity mixing such as accomplished with a Roberts Sinto or Barber Greene type pug mill is normally required. Because of these requirements, it is conventional practice in industry to carry out resin coating in a separate manufacturing plant, i.e., in a plant which is separate from the sand plant in which the raw sand is cleaned and classified into useful commercial grade sand products. This, of course, adds considerable time and expense to the cost of manufacturing these products.

Moreover, in both cases relatively large amounts of polymer resin are needed to make effective products, which adds further expense.

Furthermore, in the case of curable resin coated proppants, the ability of these products to self-cure rapidly diminishes at temperatures below about 150° F. (~66° C.). As a result, special low-temperature curing agents known in industry as "activators" are normally included in fracturing fluids containing these proppants in applications where downhole temperatures are anticipated to be 150° F. (~66° C.) or less.

SUMMARY

In accordance with this invention we have found that, in subterranean formations which are prone to proppant flowback and in addition which also exhibit relatively low ambient temperatures and relatively low closure pressures, the problem of proppant flowback can be effectively eliminated by selecting as the resin coated proppant to use for hydraulic fracturing, a resin coated proppant whose resin coating is made from an aqueous dispersion of a self-bonding vinyl aromatic/acrylic ester addition copolymer.

In particular, we have found that the resin coatings of proppants made in this way will bond together to form a polymer network in much the same way as the curable resin coatings of a conventional curable resin coated proppant form a polymer network, even though the temperatures encountered in these subterranean formations may be well below that needed for curing a conventional curable resin coated proppant, even though less polymer resin is needed to make this product than a conventional curable resin coated proppant, and even though this product can be made by simple aqueous dispersion coating techniques.

As a result, the inventive resin coated proppant is far easier and less expensive to make and use than a conventional curable resin coated proppant, because no initiator is needed to effect proppant particle bonding, because less polymer resin is needed to make the proppant, and because the high temperature/high intensity mixing coating techniques needed to make conventional curable resin coated proppants are unnecessary.

Thus, this invention provides a resin coated proppant comprising a proppant substrate particle and coating of a polymer resin on the proppant substrate particle or an optional intermediate coating layer carried by the proppant substrate particle, wherein the polymer resin is a self-bonding addition copolymer of a vinyl aromatic comonomer and an acrylic comonomer comprising an alkyl ester of acrylic acid, methacrylic acid or both and one or more alkyl groups contain 1 to 12 carbon atoms, and further wherein the resin coating has been made by forming a mixture of a mass of the proppant substrate particles and an aqueous dispersion of the self-bonding addition copolymer and drying the mixture so formed without heating to above 300° F. (~149° C.), wherein the polymer resin is capable of self-bonding at temperatures of 150° F. (~66° C.) or less, and wherein the resin coated proppant exhibits a UCS value of at least 10 psi (~69,000 N/m$^2$) at 70° F. (~21° C.).

In addition, this invention also provides a process for producing a resin coated proppant comprising forming a mixture of proppant substrate particles and an aqueous dispersion of a self-bonding addition copolymer of a vinyl aromatic comonomer and an acrylic comonomer comprising an ester of acrylic acid, methacrylic acid or both and one or more alkyl groups contain 1 to 12 carbon atoms and drying the mixture so formed without heating to above 300° F. (~149° C.).

Still further, this invention also provides a process for the hydraulic fracturing of a subterranean formation penetrated by a well comprising pumping a hydraulic fracturing fluid containing a mass of proppants down the well at a pressure high enough to fracture the subterranean formation, wherein the mass of proppants comprises the above resin coated proppant.

BRIEF DESCRIPTION OF THE DRAWINGS

FIG. 1 is a graph showing the results obtained in the following Example 9.

DETAILED DESCRIPTION

Proppant Substrate Particle

As indicated above, the inventive curable resin coated proppant comprises a proppant substrate particle carrying a coating of a self-bonding addition copolymer of a vinyl aromatic comonomer and an acrylic ester comonomer.

For this purpose, any particulate solid which has previously been used or may be used in the future as a proppant in connection with the recovery of oil, natural gas and/or natural gas liquids from geological formations can be used as the proppant substrate particle of the inventive self-suspending proppants. These materials can have densities as low as ~1.2 g/cc and as high as ~5 g/cc and even higher, although the densities of the vast majority will range between ~1.8 g/cc and ~5 g/cc, such as for example ~2.3 to ~3.5 g/cc, ~3.6 to ~4.6 g/cc, and ~4.7 g/cc and more.

Specific examples include graded sand, bauxite, ceramic materials, glass materials, polymeric materials, resinous materials, rubber materials, nutshells that have been chipped, ground, pulverized or crushed to a suitable size (e.g., walnut, pecan, coconut, almond, ivory nut, brazil nut, and the like), seed shells or fruit pits that have been chipped, ground, pulverized or crushed to a suitable size (e.g., plum, olive, peach, cherry, apricot, etc.), chipped, ground, pulverized or crushed materials from other plants such as corn cobs, composites formed from a binder and a filler material such as solid glass, glass microspheres, fly ash, silica, alumina, fumed carbon, carbon black, graphite, mica, boron, zirconia, talc, kaolin, titanium dioxide, calcium silicate, and the like, as well as combinations of these different materials. Especially interesting are intermediate density ceramics (densities ~3.1-3.5 g/cc), normal frac sand (density ~2.65 g/cc), bauxite and high density ceramics (density ~3.5-5 g/cc), just to name a few.

Resin coated varieties of these particulate solids can also be used.

All of these particulate materials, as well as any other particulate material which is used as a proppant in the future, can be used to make the inventive self-suspending proppants.

Polymer Resin

In accordance with this invention, the polymer system which is used to make the inventive curable resin coated proppants is an aqueous dispersion of a self-bonding vinyl aromatic/acrylic ester addition copolymer. More specifically, this polymer system is an aqueous dispersion of a self-bonding addition copolymer of a vinyl aromatic comonomer and an acrylic alkyl ester comonomer comprising an alkyl ester of acrylic acid, methacrylic acid or both in which the alkyl groups contain 1 to 12 carbon atoms.

The self-bonding addition copolymer of this invention can be made from any vinyl aromatic comonomer including mixtures of different vinyl aromatic comonomers. Normally, it will be made from styrene, α-methyl styrene, vinyl toluene or mixtures thereof.

Similarly, this self-bonding addition copolymer can be made from any alkyl ester of acrylic acid, methacrylic acid or both in which the alkyl groups contain 1-12 alkyl carbon atoms. Mixtures of these alkyl groups also be used to form these esters. Esters made with methyl, ethyl and 2-ethylhexyl alkyl groups are especially interesting.

The relative amounts of the vinyl aromatic comonomer and acrylic ester comonomer in this self-bonding addition copolymer can vary widely, and essentially any amount can be used. Normally, the amounts of each of these comonomers will be at least 10 wt. %, based on the total weight of the addition copolymer. More typically, the amounts of each of these comonomers will be at least 15 wt. %, at least 20 wt. %, at least 25 wt. %, at least 30 wt. %, at least 35 wt. %, or even at least 40 wt. % on this basis.

Other addition comonomers can also be included in these self-bonding addition copolymers, examples of which include vinyl chloride, vinyl alcohol, vinyl acetate, various dicarboxylic acids such as maleic acid, fumaric acid, itaconic acid, etc. If so, the total amount of these other addition comonomers should be 40 wt. % or less, based on the weight of the self-bonding addition copolymer. Normally, the total amount of these other addition comonomers will be 30 wt. % or less, 20 wt. % or less, 10 wt. % or less, 5 wt. % or less, or even 2 wt. % or less.

As indicated above, the addition copolymers used to make the inventive resin coated proppants are self-bonding. In this context, "self-bonding" means that, when the carrier liquid of the aqueous dispersion supplying this addition copolymer evaporates, the individual particles of addition copolymer in this dispersion coalesce and bond to one another to form a coherent coating—much in the same way that drying of a conventional house paint causes a smooth continuous paint coating to form. Thus, like conventional house paints, these self-bonding addition copolymers will bond solely under the influence moderate temperatures as low as 70° F. (~21° C.) and lower, with additional curing means such as the application of UV radiation, using additional curing agents, etc., being unnecessary. Thus, the activators which must be used with conventional curable resin coated proppants in applications involving downhole temperatures less than 150° F. (~66° C.) are unnecessary and hence can be completely avoided.

Although self-bonding addition copolymers that are capable of self-bonding at temperatures as low as 70° F. (~21° C.) or even less will normally be used for carrying out this invention, self-bonding addition copolymers which are capable of self-bonding at higher minimum temperatures, e.g., as low as 80° F. (~27° C.), as low as 90° F. (~32° C.), as low as 100° F. (~38° C.) and even as low as 120° F. (~49° C.), can also be used.

Aqueous dispersions of self-bonding vinyl aromatic/acrylic ester addition copolymers which can be used to made the inventive curable resin coated proppants are widely available commercially, and essentially any such commercial aqueous dispersion can be used. Examples include the Acronal line of self-crosslinking acrylic dispersions available from BASF, the RHOPLEX and PRIMAL lines of self-crosslinking acrylic emulsions available from Dow Chemical Company, the Vinnapas line of self-crosslinking acrylic dispersions available from Wacker Chemicals, and similar lines of self-crosslinking acrylic dispersions available from other vendors such as Bayer, Arkema and Henkel.

Coating Process

In order to make the inventive resin coated proppants, an aqueous dispersion of the above self-bonding addition copolymer is combined with a mass of proppant substrate particles and the mixture so formed allowed to dry. Some additional mixing and/or heating of this mixture can occur to promote uniform coating, although this is not absolutely necessary.

In accordance with this invention, this coating and drying operation is accomplished without heating the mixture of proppant substrate particles and polymer coating resin to a temperature above 300° F. (~149° C.). This is not to say that this coating and drying operation must not be accomplished above this temperature—only that heating to above this temperature is unnecessary and therefore can be avoided, if desired. More typically, this coating and drying operation will be accomplished without heating the mixture of proppant substrate particles and polymer coating resin to a temperature above 250° F. (~121° C.), above 225° F. (~107° C.), above 200° F. (~93° C.), above 175° F. (~79° C.) or even above 150° F. (~66° C.).

In addition, this coating and drying operation is also preferably accomplished without subjecting the mixture of proppant substrate particles and polymer coating resin to high intensity mixing, although gentle mixing can be used if desired. In this context, "high intensity" mixing will be understood to mean the type of vigorous mixing that occurs when conventional resin coated proppants are made in mixing equipment (e.g., pug mills) appropriate for this purpose such as available from Roberts Sinto, Barber Greene and many others. As appreciated by those skilled in the art, this type of mixing equipment is designed for applications in which large amounts of particulates such as sand, other proppants, gravel, limestone and the like are mixed and coated with relatively small amounts of liquids such as asphalt, molten novolac resins, phenolic urethane resins and the like. Because the amount of liquid coating is relatively small compared to the amount of particulate being coated, and further because relatively large amounts of particulates are processed, high energy intense mixing is normally required to insure that the particulates are coated uniformly.

As indicated above, conventional curable resin coated proppants are normally made by procedures which require heating the mixture of proppant substrate particles and the polymer coating resin to temperatures of ~300° F. (~149° C.) or more. In addition, in most cases this mixture must also be subjected to high intensity mixing. This is because these procedures are necessary not only to insure that each individual proppant substrate particle is provided with its own polymer resin coating but also to insure that the curable resin coated proppants ultimately produced are free-flowing in the sense that any clumping or agglomeration that may occur can be easily broken up with gentle agitation.

In accordance with this invention, these high heat and high intensity mixing steps can be avoided, because fully functioning resin coatings can be produced on proppant substrate particles by simple dispersion coating techniques which do not require these steps. This represents a significant advantage in terms of manufacturing these proppants, because the special equipment needed to carry out these high heat and high intensity mixing steps need not be used in connection with making these proppants.

This feature of the invention finds particular advantage when conventional hydraulic fracturing sand ("frac sand") is used to make the inventive resin coated proppants. This is because, in these instances, the inventive proppants can conveniently be produced in the same plant in which the frac sand is produced (the "sand plant") simply be adding the mixing equipment needed to coat this frac sand with the aqueous polymer dispersions of this invention to the end of the frac sand production line.

In this regard, producing useful commercial grade sand products in a sand plant usually involves washing the raw sand to remove dirt and debris and then classifying the washed sand into predetermined sizes and/or grades. For this purpose, the raw sand is normally heated to elevated temperatures so that drying of the sand after washing and classifying can be accelerated by the latent heat in the sand. Typically, the cleaned and classified sand products produced by the sand plant are still warm after production has been completed.

The temperatures of these still warm sand products, which can often be about 90° F. (~32° C.) to 200° F. (~93° C.), are too low to be useful in producing conventional curable resin coated proppants, which are normally heated to above 300° F. (~149° C.) in manufacture, as indicated above. In accordance with this invention, however, these sand temperatures are high enough so that rapid and complete evaporation of the water in the aqueous dispersions used to make the inventive resin coated proppant can be fostered by the latent heat still remaining in the sand. Therefore, a particular advantage of this invention when conventional frac sand is used to make the inventive resin coated proppant is that the latent heat remaining in this frac sand product, after it is made, can be used to facilitate manufacture of this proppant rather than simply being wasted, as occurs in conventional practice.

Polymer Loadings

There is no particular restriction on the amount of self-bonding addition copolymer coating that can be present in the inventive resin proppants, and essentially any amount can be used. So for example, polymer loadings (post drying) of as little as 0.1 wt % and as much as 20 wt. % on a dry weight basis, based on the weight of the proppant substrate particle, can be used. Typically, however, the amount of self-bonding addition copolymer coating will be about 0.3 to 5 wt. %, even more typically about 0.4 to 2 wt. %, or even 0.5 to 1.5 wt. %, on this basis.

In this regard, it has been found in accordance with another feature of this invention that the consolidated proppant packs which are made from the inventive resin coated proppants, when used in low temperature and low closure stress applications, exhibit superior conductivities even when these proppants are made with less polymer resin than conventional curable resin coated proppants available in the past.

As previously indicated, the curable polymer resins which are normally used to make conventional curable resin coated proppants are either novolacs or phenolic urethanes. Normally, about 1.5 wt. % or more of these polymers, based on the weight of the proppant substrate particle, are used to make these products.

In accordance with this invention, we have found that, when made with less than this amount of polymer loading, the inventive resin coated proppant exhibits better conductivities than otherwise identical curable resin coated proppants made with these novolac and/or phenolic urethanes. In accordance with this embodiment of the invention, therefore, the amount of self-bonding addition copolymer coating that is present in the inventive resin coated proppants is desirably maintained at 0.3 to <1.5 wt. %, more typically, 0.4 to 1.4 wt. % or even 0.5 to 1.3 wt. %. Polymer loadings of 0.3 to ≤1.4 wt. %, 0.3 to ≤1.3 wt. %, 0.4 to ≤1.2 wt. %, 0.5 to 1.1 wt. %. and 0.5 to 0.8 wt. % are contemplated, as are polymer loadings of ≤1.0 wt. %, ≤0.8 wt. %, ≤0.6 wt. %.

Control of Clumping

During a hot summer's day especially in the southern United States, the inventive resin coated proppants may be exposed to temperatures as high as 120° F. (~49° C.) and relative humidities as high as 80-90% during storage and shipment. As a result, they may undergo premature clumping and/or agglomeration, making them difficult or impossible to use.

To prevent this from occurring, a number of different approaches can be taken. In one such approach, the outer surface of the proppant's polymer resin coating can be chemically modified such as by crosslinking or the like. The extent and/or degree of this chemical modification/crosslinking should be enough to prevent the resin coatings of contiguous proppants from bonding together that would otherwise occur during storage and shipment, but not so much as to prevent bonding once the proppant reaches its intended destination downhole.

For this purpose, any chemical modifier which will prevent or retard additional bonding from occurring at the very surface of the proppant's addition copolymer resin coating can be used. Examples include phosphorous oxychloride, epichlorohydrin, epoxy and its derivatives, polymeric diisocyanate and their derivatives, polymeric carboxylic acids, anhydrides, aldehydes, borates and their derivatives, guar and its derivatives.

Although not wishing to be bound to any theory, we believe premature clumping and/or agglomeration is prevented because the chemical modifier/crosslinking agent which is applied to the surface of the resin coating reacts with the functional sites of the polymer at this surface to form a protective shell surrounding this coating. As a result, the resin coatings of contiguous proppant particles are prevented from bonding to one another. This, in turn, prevents clumping/agglomerating of these proppants during storage and transport above ground.

On the other hand, when these proppants reach their ultimate destinations downhole, the elevated pressures encountered there are sufficient to degrade this protective shell, thereby releasing the bondable resin coatings underneath. As a result, contiguous proppant particles can bond to one another to form a strong, coherent proppant pack in a conventional manner. In a sense, therefore, these proppants can be considered to be "pressure-activated," because it is the elevated pressures encountered downhole which cause these proppants to bond to one another.

Another approach that can be used for preventing premature clumping and/or agglomeration above ground is coating the inventive curable resin coated proppants with a suitable partitioning agent, also known as "anti-caking" agents. Examples include sodium carbonate, sodium bicarbonate, sodium trimetaphosphate, calcium carbonate, calcium silicate, silica and its derivatives such as colloidal silica and fumed silica, talc, kaolin, bentonite, diatomaceous earth, microcrystalline cellulose, and attapulgate.

As in the case of using a chemical modifier/crosslinking agent, we believe premature clumping/agglomeration is prevented when partitioning agents are used, because they form a barrier between contiguous proppants during storage and shipment which prevents the curable resin coatings of contiguous proppant particles from bonding to one another at this time. However, when these proppants reach their ultimate destinations downhole, the elevated pressures encountered there degrade this barrier, thereby releasing the bondable resin coatings underneath for bonding to one another. Therefore, these proppants can also be considered to be "pressure-activated," because it is the elevated pressures encountered downhole which cause these proppants to bond to one another.

Additional Properties

In addition to being able to self-bond at temperatures as low as 70° F. (~21° C.), the inventive resin coated proppants also exhibit a number of additional properties which make them ideally suited for use in the hydraulic fracturing of geological formations exhibiting low closure pressures (stresses). In this context, a "low closure pressure" will be understood to be a closure pressure of 6,000 psi or less.

One such test property is good crush strength. The crush strength of a resin coated proppant is a measure of the ability of individual grains of the curable resin coated proppants to resist proppant pack failure in response to a large applied stress. It is different from the UCS value (unconfined compressive strength) of the proppant, which is further described below, which is a measure of the strength of a proppant pack made from a curable resin coated proppant and, by implication, the strength of the polymer used to make this proppant.

The crush strength of a curable resin coated proppant can be measured by the following analytical test: About 65 g of the proppant is poured into a test cell, after which a specified amount of pressure (e.g., 6000 psi to 12000 psi) is applied to the proppant via a piston. After releasing the pressure, the proppant sample is sieved. The amount of fines generated as a percentage of the total amount of proppant tested is measure of the crush strength of the proppant.

In accordance with this invention, it has been found that the inventive resin coated proppants exhibit crush strengths which are essentially the same as that exhibited by the proppant substrate particles from which they are made. This shows that the polymer resin coatings of this invention do not adversely affect the crush strength of the product proppants ultimately obtained.

Another important property exhibited by the inventive curable resin coated proppants is good UCS values. The UCS value or "Unconfined Compressive Strength" of a resin coated proppant is a measure of the ability of a proppant pack formed from a mass of the resin coated proppant to resist proppant pack failure when exposed to the temperatures and pressures likely to be encountered downhole. It is also an accurate measure of the ability of a proppant to resist proppant flowback, since most proppant flowback occurs when failure of a proppant pack occurs. It is also an accurate measure of the strength of the curable polymer resin that is used to make the proppant, once this polymer resin is cured. UCS value is not a measure of proppant crush strength, which as indicated above is measured by a different test.

The UCS value of a proppant is a function of temperature in the sense that the ability of a proppant pack to resist proppant pack failure in response to an applied pressure depends on its temperature.

The UCS values of a resin coated proppant can be determined by the following analytical test: This test involves two parts, creating a test specimen followed by testing of the specimen so made. To create the specimen, a quantity of the proppant (e.g., 85 g) is mixed with a 2% aqueous KCl solution for 5 minutes to simulate the naturally occurring water the proppant will likely see in use downhole. The proppant slurry is then poured into a cylindrical UCS cell assembly, one side of which has a screen to remove any excess liquid while the other side has a sliding piston. The cell assembly so formed is then maintained for a suitable period of time (e.g., 24 hours) at the predetermined temperature of the test (e.g., 150° F., ~66° C.) and predetermined pressure (e.g., 1000 psi, ~6,894,757 N/m$^2$) which simulate the temperature and pressure the proppant will see in its ultimate use location downhole. This causes any liquid remaining in the proppant mass to be removed through the screen and the individual proppant particles to consolidate as a result of particle-to-particle bonds that form as the resin coatings on each proppant particle cure. The result is that a specimen is formed in the shape of the UCS cylindrical cell, this specimen being a consolidated mass of proppant, i.e., a proppant pack.

In the second part of the test, the specimen so formed is then tested for its UCS value. This is done by placing the specimen in an automated press which measures the maximum axial compressive stress the specimen can withstand before failure of the proppant pack occurs. Note that, in this test, the specimen is unconfined in the sense that its cylindrical walls are free of any support. As a result, the value generated by this test, which is referred to as the unconfined compressive strength of the resin coated proppant, and which is normally given in psi or N/m$^2$, is an accurate measure of the ability of the proppant pack so formed to resist degradation at the simulated conditions of the test.

In accordance with this invention, it has been found that the inventive resin coated proppant normally exhibits UCS values at 70° F. (~21° C.) of at least 10 psi (~69,000 N/m$^2$). More typically, the inventive curable resin coated proppant exhibits UCS values at 70° F. (~21° C.) of at least 20 psi (~440,000 N/m$^2$), at least 30 psi (~207,000 N/m$^2$), or even at least 40 psi (~275,000 N/m$^2$).

Meanwhile, at 150° F. (~66° C.), the inventive resin coated proppant normally exhibits UCS values of at least 20 psi (~140,000 N/m$^2$), more typically at least 40 psi (~275,000 N/m$^2$), at least 60 psi (~415,000 N/m$^2$), at least 80 psi (~550,000 N/m$^2$), at least 100 psi (~690,000 N/m$^2$), at least 120 psi (~830,000 N/m$^2$), or even at least 150 psi (~1,035,000 N/m$^2$).

Still another important property exhibited by the inventive resin coated proppants is good conductivity. The conductivity of a resin coated proppant is a measure of the ability of a consolidated mass of the proppant, i.e., a proppant pack, to conduct fluid—oil, water, and gas—from a subterranean formation containing the proppant pack to a wellbore penetrating the formation. It is a function of both temperature and pressure.

The conductivity of a resin coated proppant can be measured by the following analytical test: A quantity of the proppant to be tested is sandwiched between two sandstone plugs or cores in a conductivity test cell. The cell is then placed in a hydraulic press, whose platens/pistons are arranged to exert a compressive stress on the proppant acting through the two sandstone plugs/cores. Pressure transmitters are connected to the inlet and outlet of the cell to record the differential liquid pressure across the pack, i.e., the difference between the pressure of the test liquid flowing into and out of the pack. The cell is then heated to the temperature of the test, using heaters or heating liquid flowing through a metal jacket.

The conductivity of the proppant is then measured at a series of different compressive stresses typically ranging from 2,000 psi (13.8 MPa) to as much as 14,000 psi (96.5 MPa) or more. Normally, the test starts by flowing a heated 2% KCl test solution through the proppant pack at an applied compressive stress of 50 psi (0.34 MPa). The applied compressive stress is then increased to 2,000 psi (13.8 MPa), and the flow rate of the test liquid through the pack as well as its pressure drop across the pack are record. This procedure is repeated a number of times at successively greater applied pressures, usually by increments of 2,000 psi (13.8 MPa), with a typical test lasting as long as 10 days or even longer. Proppant conductivity, which is determined using Darcy's law and is given in millidarcy-feet or md-ft at the particular temperature of the test, is recorded at the different pressures tested.

In accordance with this invention, it has been found that the inventive resin coated proppant exhibits conductivities which are at least as good as, and often better than, the conductivities exhibited by the proppant substrate particles from which this inventive proppant is made, at least at low closure pressures. This shows that the polymer resin coatings of this invention do not adversely affect the conductivity of the product proppants ultimately obtained.

WORKING EXAMPLES

In order to more thoroughly describe this invention, the following working examples are provided:

Examples 1-6: Aqueous Emulsion of Acrylic Acid Ester/Styrene Copolymer 1 kg samples of 20/40 frac sand were coated with a self-bonding polymer resin in an amount of either 1 wt. % or 2 wt. %, based on the proppants substrate particles being coated. Two different commercially available liquid polymer systems were used for this purpose, both of which were aqueous dispersions of copolymers of styrene and an acrylic acid ester. This was done by introducing the sand into a mixing device (Kitchen Aid mixer) followed by introducing the liquid polymer systems with mixing. In these examples, the sand was preheated to 160° F. (~71° C.), although this is unnecessary.

After mixing for two minutes, 0.03 wt. % to 0.6 wt. % of a silica powder anticaking agent, on the same basis, was added and the mixture so formed mixed for an additional 1 minute. The mixture was then discharged from the mixer, and sieved to obtain resin coated proppants of the desired particle size.

The proppants so obtained were then tested for UCS and proppant crush resistance. The results obtained are set forth in the following Table 1, with the two different polymer systems used being designated as α and β. For comparative purposes, the crush resistance of uncoated frac sand was also determined and provided in this table.

TABLE 1

UCS and Crush Strength of Inventive Proppants

| Ex | Resin Type | LOI, wt. % | Silica wt. % | UCS, psi 70° F. | UCS, psi 50° F. | Crush Strength, psi 6K | 7K | 8K | 9K |
|---|---|---|---|---|---|---|---|---|---|
| A | none | | | | | 7.1 | 10.8 | | |
| 1 | α | 1 | 0.05 | | 40 | | 9 | 11.5 | |
| 2 | β | 1 | 0.05 | | 69 | 8.8 | 12.2 | | |

TABLE 1-continued

UCS and Crush Strength of Inventive Proppants

| | Resin | | | | | | | | |
|---|---|---|---|---|---|---|---|---|---|
| | | LOI, | Silica | UCS, psi | | Crush Strength, psi | | | |
| Ex | Type | wt. % | wt. % | 70° F. | 50° F. | 6K | 7K | 8K | 9K |
| 3 | α | 2 | 0.10 | | 180 | | 6.1 | 8.1 | 10.6 |
| 4 | β | 2 | 0.10 | | 109 | | 9.4 | 11.4 | |
| 5 | α | 1 | 0.03 | 27 | | | | | |
| 6 | β | 1 | 0.03 | 25 | | | | | |

As can be seen from Table 1, at 150° F. (~66° C.) the inventive resin coated proppants of Examples 1 to 4 exhibit UCS values of 40 to 109 psi, while at 70° F. (~21° C.) the inventive resin coated proppants of Examples 5 and 6 exhibit UCS values of 27 and 29 psi, respectively. This indicates that proppant packs which are made from these proppants when used at these downhole temperatures will resist mechanical degradation from the elevated pressures also encountered there, at least up to maximum pressure levels indicated by their UCS values. This, in turn, further indicates that, at these downhole conditions, these proppants can effectively resist proppant flowback at least until these maximum pressure levels have been reached.

Table 1 also shows that the crush strengths of the inventive resin coated proppants of Examples 1 to 4 are essentially the same as the crush strength of the raw sand control. This shows that the polymer resin coatings of this invention do not adversely affect the crush strength of the product proppants ultimately obtained.

The inventive resin coated proppant of Example 1 as well as the uncoated frac sand control were was also tested for proppant conductivity at 150° F. (~66° C.). In this test, the proppants were subjected to successively increasing pressure levels from 2,000 psi to 10,000 psi, and the conductivities of the proppants measured immediately after each of these pressure levels was reached. The maximum pressure level used was 10,000 psi. The results obtained are set forth in the following Table 2.

TABLE 2

Conductivities of Proppant of Example 1 and Conventional Frac Sand @ 150° F.

| | Conductivity, mD/ft | |
|---|---|---|
| Applied Pressure, psi | Example 1 | Frac Sand Control |
| 2,000 | 4521 | 3707 |
| 4,000 | 3499 | 3010 |
| 6,000 | 2100 | 2094 |
| 8,000 | 1004 | 1382 |
| 10,000 | 448 | 772 |

As can be seen from Table 2, the conductivity of the inventive resin coated proppant was greater than that of conventional frac sand at applied pressures up to 6,000 psi. This indicates that, when the inventive curable resin coated proppant is used in subterranean formations having relatively low closure stresses such as ~6,000 psi or less, the polymer resin coatings of these proppants do not decrease, but actually increase, the conductivities of these proppants.

The inventive resin coated proppants of Examples 1-6 were stored at room temperature for up to several months, after which they were tested for clumping/agglomeration. No substantial clumping/agglomeration was found.

Examples 7 and 8

A number of different resin coated proppants were prepared using 20/40 grade conventional frac sand as the proppant substrate particles. In some cases, these proppants were made with the conventional curable polymer resins used to make conventional curable resin coated proppants, while in other instances these proppants were made in accordance this invention. All were tested for proppant conductivity at temperatures ranging from 125° F. (~52° C.) to 250° F. (~121° C.) at pressure levels ranging from 2,000 psi to 10,000 psi. Uncoated frac sand was also tested as a control.

The results obtained are set forth in the following Table 3.

TABLE 3

Conductivities of Various Proppants and Conventional Frac Sand at Different Temperatures

| | Polymer Resin | | | Conductivities in mD/ft at different press, psi | | | | |
|---|---|---|---|---|---|---|---|---|
| Ex | Type | Wt. % | Temp, ° F. | 2K | 4K | 6K | 8K | 10K |
| B | Raw Sand | | 150 | 2780 | 2179 | 1435 | 981 | 669 |
| 7 | Styrene/acrylate copoly-α | 0.5 | 150 | 3561 | 2414 | 1391 | 836 | 461 |
| 8 | Styrene/acrylate copoly-β | 0.5 | 150 | 3379 | 2343 | 1358 | 785 | 432 |
| C | Raw Sand | | 250 | 2654 | 2082 | 1305 | 834 | 494 |
| D | Phenolic Novolac | 0.75 | 250 | 2775 | 2065 | 1165 | 554 | 288 |
| E | Phenolic Novolac | 1.5 | 250 | 2580 | 2280 | 1682 | 1136 | 694 |

As can be seen by comparing Examples 7 and 8 with Comparative Example B, at a temperature of 150° F. (~66° C.), the conductivities of the inventive resin coated proppants were greater than that of conventional frac sand at applied pressures up to 4,000 psi and only slightly less at 6,000 psi. As in the case of Table 2, this also indicates that the polymer resin coatings of these proppants do not decrease, but actually increase, the conductivities of these proppants when used at relatively low closure pressures.

Most significantly, the data in this table also shows that at applied pressures up to 6,000 psi, and except for Comparative Example E in which the proppant was made with 1.5 wt. % of a conventional phenolic novolac resin, the inventive resin proppants exhibited conductivities at different temperatures which were at least as good as and in most instances better than that exhibited by uncoated raw sand as well as the conventional resin coated proppants, even though the amount of curable polymer resin used (0.5 wt. %) was substantially less than that used in the conventional resin coated proppants (0.75 wt. % and 1.5 wt. %). This indicates that the inventive resin coated proppants, when used in subterranean formations having lower closure pressures and temperatures, can provide proppant conductivities significantly better than that provided by conventional curable resin coated proppants even though the amount of curable polymer resin used is considerably less.

Example 9

In order to further demonstrate the performance of the inventive resin coated proppant, the conductivity of a proppant pack formed from one of the inventive resin coated proppants of Example 1 when exposed to a simulated closure pressure of 8000 psi (55.2 N/mm$^2$) pressure at 150° F. (65.6° C.) was periodically measured over the course of 250 hours. In addition, for comparative purposes, the same conductivity test was carried out on a proppant pack made from a conventional novolac resin coated proppant.

The results obtained are illustrated in FIG. 1.

From FIG. 1, it can be seen that the inventive resin coated proppant exhibited conductivities almost as good as that exhibited by the conventional novolac resin coated proppant for the entire 250 hour duration of the test. This demonstrates that the inventive resin coated proppant performs essentially as good as its conventional counterpart, even though it is far easier and less expensive to make because less polymer resin is needed and further because high temperature/high intensity mixing techniques are unnecessary.

From the foregoing, it can be seen that this invention provides many advantages over conventional technology relating to curable resin coated proppants. Thus, at 1,000 psi, the inventive resin coated proppants exhibit good UCS values (>10 psi) even at lower temperatures (70° F.), even though they are made with less curable polymer resin than the conventional products, at higher temperatures such as 200° F., the inventive resin coated proppants exhibit even better UCS values (>50 psi), again at 1,000 psi, no special equipment or procedures such as heating to high temperatures or high shear mixing are needed to make the inventive resin coated proppants since they can be made by simple coating techniques such as spay coating and the like at room temperature, the inventive curable resin coated proppants are storage stable, even at high ambient temperatures and humidities, when tested at 150° F. (~66° C.) the resin coatings of the inventive proppants do not adversely affect, and indeed often improve, proppant conductivities when used in subterranean formations having low closure pressures of about 6,000 psi, the resin coatings of the inventive proppants do not adversely affect their crush strengths, and the inventive resin coated proppants do not interact negatively with other frac fluid components.

Although only a few embodiments of this invention have been described above, it should be appreciated that many modifications can be made without departing from the spirit and scope of the invention. All such modifications are intended to be included within the scope of this invention, which is to be limited only by the following claims:

The invention claimed is:
1. A curable resin coated proppant comprising:
a proppant particle and
a curable coating on the proppant particle, wherein the curable coating:
comprises an addition copolymer of a vinyl aromatic comonomer and an acrylic ester comonomer comprising an alkyl ester of acrylic acid, methacrylic acid or both and one or more alkyl groups containing 1 to 12 carbon atoms, wherein the addition copolymer self-bonds at temperatures of 150° F. (~66° C.) or less, wherein the self-bonding improves fracture conductivity of the curable resin coated proppant over a proppant particle that is uncoated with the curable coating under pressures between 2,000-6,000 psi,
has an Unconfined Compressive Strength ("UCS") value of at least 10 psi (~69,000 N/m$^2$) at 70° F. (~21° C.), and
is formed by adding the proppant particle to an aqueous dispersion of the addition copolymer at a temperature of 250° F. (121° C.) or less and drying without heating to above 250° F. (121° C.).

2. The curable resin coated proppant of claim 1, wherein the vinyl aromatic comonomer is at least one of styrene, α-methyl styrene and vinyl toluene.

3. The curable resin coated proppant of claim 2, wherein the addition copolymer is an acrylic acid ester/styrene copolymer.

4. The curable resin coated proppant of claim 1, wherein the resin coated proppant exhibits a UCS value of at least 20 psi (~138,000 N/m$^2$) at 70° F. (~21° C.).

5. The curable resin coated proppant of claim 1, wherein the resin coated proppant exhibits a UCS value of at least 40 psi (~275,000 N/m$^2$) at 150° F. (~66° C.).

6. The curable resin coated proppant of claim 1, wherein the addition copolymer is capable of self-bonding at temperatures of 70° F. (~21° C.) or less.

7. The curable resin coated proppant of claim 1, wherein the amount of curable coating is 0.3 to ≤1.4 wt. %, based on the weight of the proppant particle on a dry weight basis.

8. The curable resin coated proppant of claim 1, wherein the curable coating has been made from a self-crosslinking acrylic dispersion or emulsion.

9. The curable resin coated proppant of claim 7, wherein an amount of curable coating is ≤1.1 wt. %, based on the weight of the proppant particle on a dry weight basis.

10. The curable resin coated proppant of claim 7, wherein an amount of curable coating is ≤0.7 wt. %, based on the weight of the proppant particle on a dry weight basis.

11. The curable resin coated proppant of claim 7, further comprising a coating of an anti-caking agent on the curable coating.

12. The curable resin coated proppant of claim 1, wherein the addition copolymer contains at least 10 wt. % of an acrylic ester comonomer.

13. The curable resin coated proppant of claim 12, wherein the addition copolymer contains at least 20 wt. % acrylic ester comonomer.

14. The curable resin coated proppant of claim 13, wherein the addition copolymer contains at least 35 wt. % acrylic ester comonomer.

15. The curable resin coated proppant of claim 14, wherein the addition copolymer contains at least 40 wt. % acrylic ester comonomer.

16. The curable resin coated proppant of claim 1, wherein the addition copolymer comprises the vinyl aromatic comonomer, the acrylic ester comonomer and one or more other addition comonomers selected from the group consisting of vinyl chloride, vinyl alcohol, vinyl acetate, maleic acid, fumaric acid and itaconic acid.

17. The curable resin coated proppant of claim 16, wherein the addition copolymer consists of the vinyl aromatic comonomer and the acrylic ester comonomer.

18. The curable resin coated proppant of claim 17, wherein the addition copolymer comprises acrylic acid ester and styrene.

* * * * *